US006071344A

United States Patent [19]
Perego

[11] Patent Number: 6,071,344
[45] Date of Patent: Jun. 6, 2000

[54] TRANSFERRING DEVICE FOR OPTICAL DISCS BEING PROCESSED IN A DISC MANUFACTURING ASSEMBLY, DISC MANUFACTURING ASSEMBLY INCORPORATING THE TRANSFERRING DEVICE, AND ASSOCIATED TRANSFERRING METHOD

[75] Inventor: Luciano Perego, Milan, Italy

[73] Assignee: Tapematic U.S.A., Inc., Orlando, Fla.

[21] Appl. No.: 08/996,746

[22] Filed: Dec. 23, 1997

[30] Foreign Application Priority Data

Mar. 12, 1997 [EP] European Pat. Off. ............... 97830111

[51] Int. Cl.[7] .................................................. B05C 11/00
[52] U.S. Cl. .......................... 118/500; 414/222; 414/225; 414/935; 414/941
[58] Field of Search ............................. 118/500, 50, 719, 118/730; 414/935, 941, 222, 225; 427/162, 240

[56] References Cited

U.S. PATENT DOCUMENTS 5,232,505   8/1993   Novak et al. ............................ 414/222

*Primary Examiner*—Laura Edwards
*Attorney, Agent, or Firm*—Frommer Lawrence & Haug LLP

[57] ABSTRACT

A transferring device which operates on an apparatus for producing optical discs comprising several different work stations, each arranged to perform a predetermined operation on the discs being processed. The transferring device performs a sequential transfer of each disc between the different work stations following a path comprising two parallel advance lines, one forward line and one return line, respectively, which are disposed laterally on opposite sides relative to the longitudinal extension axis of a support arm. The support arm supports a first and a second series of pick-up heads arranged to execute the optical disc transfer on the forward and return lines during the forward and return strokes of the support arm, respectively.

6 Claims, 2 Drawing Sheets

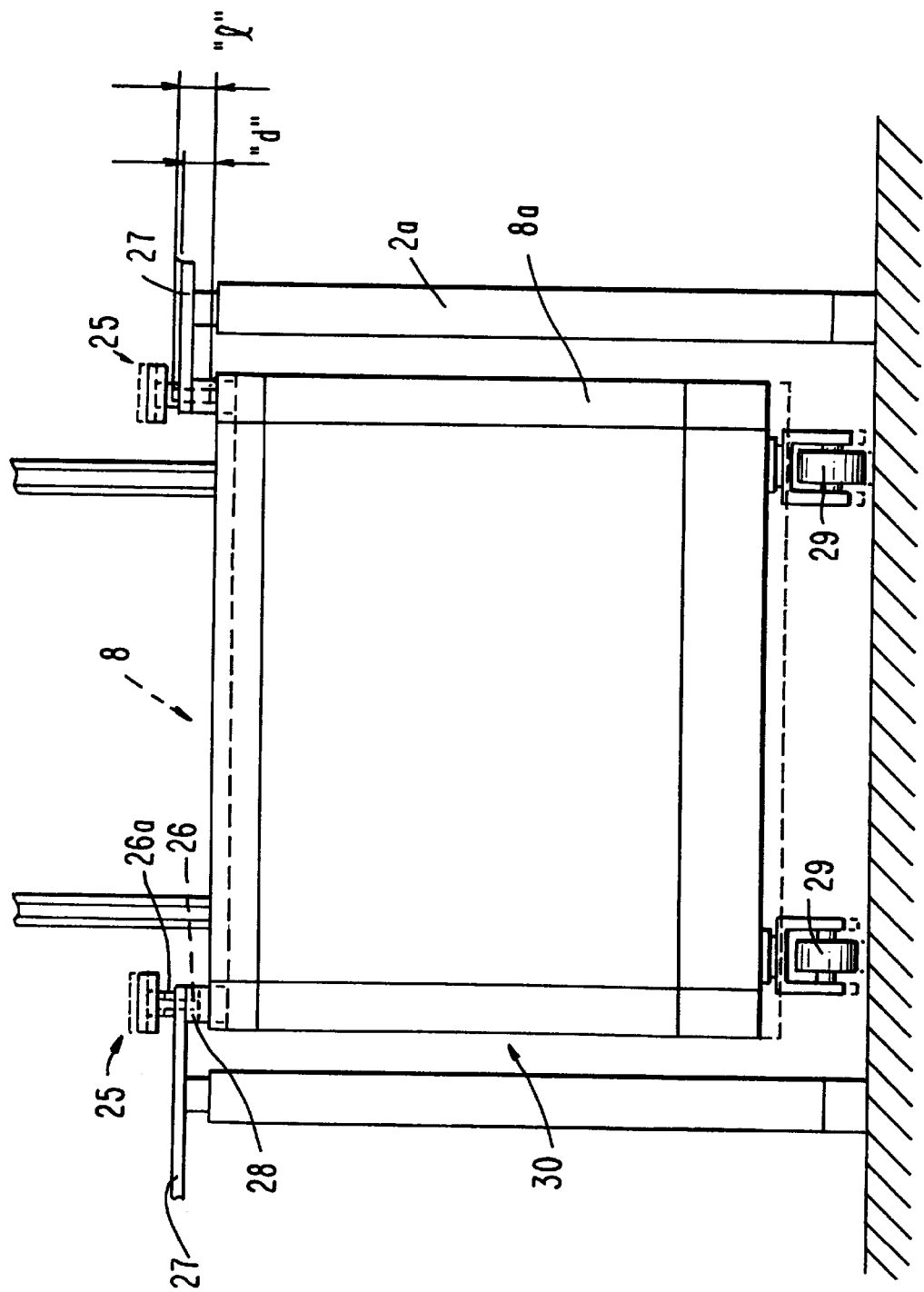

TRANSFERRING DEVICE FOR OPTICAL DISCS BEING PROCESSED IN A DISC MANUFACTURING ASSEMBLY, DISC MANUFACTURING ASSEMBLY INCORPORATING THE TRANSFERRING DEVICE, AND ASSOCIATED TRANSFERRING METHOD

FIELD OF THE INVENTION

The present invention relates to a transferring device for optical discs being processed in a disc manufacturing assembly, and more particularly, to a transferring device for optical discs being processed in a disc manufacturing assembly which includes at least one support arm, pick-up means operatively carried by the support arm and adapted to be actuated for selectively picking up and releasing at least one optical disc being processed, and a drive member acting on the support arm to reciprocate the arm between a first end-of-stroke or limit position and a second end-of-stroke or limit position.

The present invention further relates to an assembly for manufacturing optical discs incorporating this transferring device, as well as the associated optical-disc transferring method put into practice by this transferring device.

BACKGROUND OF THE INVENTION

It is known that production of data-storage optical discs, of the type commercially identified by abbreviations "CD"' or "DVD", involves manufacture by a precise injection-molding step, which disc must be subsequently submitted to several different processing work stations to enable reading and/or providing the disc with appropriate protection for the data contained therein.

As a result, the semi-finished disc obtained from a molding process is loaded onto an assembly provided with different work stations each of which carries out a predetermined operation contemplated in the disc processing cycle. For instance, discs of the type commonly referred to as "CD" are first submitted to a metallizing treatment, i.e. vacuum plating is performed on their surface bearing the recorded data. In a subsequent step, the metallized surface is submitted to a lacquering treatment involving deposition of a protective layer of transparent plastic material thereon. The lacquered disc is then submitted to a lacquer-drying step to be afterwards transferred to an outlet station provided with a collecting magazine or other means adapted to move the finished disc away from the manufacturing assembly.

A control station is often provided upstream of the outlet station which performs a qualitative inspection of the finished discs and an additional selecting station transfers faulty discs, if any, to an auxiliary collection magazine.

Presently, transfer of the individual discs being processed from each work station to a subsequent work station is performed by mechanical handling devices which include a support arm provided which is reciprocally movable about a vertical axis and has a pick-up head at its end. This pick-up head by means of suction-cups or other appropriate means to be actuated pneumatically, picks the disc up from a work station and deposits it in the immediately following work station.

In other prior assemblies manufacturing optical discs, a turntable is also utilized in combination with the above-described handling devices. Such turntables have circumferentially distributed seatings each adapted to engage a respective optical disc in order to submit it, as a result of successive angular rotations imparted to the turntable, to the action of different work stations disposed about the turntable itself.

From the foregoing, it has been found that the use of many mechanical handling devices operating independently of each other to perform transfer of the discs between two specific locations within the assembly complicates the structure as (1) more expensive space is required for housing the handling devices and enabling movement of the same, and (2) a specific drive unit is required for each handling device, the operation of which must occur in synchronism with all of the machine components of the manufacturing assembly. Moreover, in this prior handling devices, each handling device is only utilized for half of its operating cycle, since its return stroke after transfer of the disc is an idle stroke.

On the other hand, while the turntable presents the possibility of interlocking different work stations to a single turntable without requiring the latter to execute idle strokes, such a turntable is extremely bulky, especially if the number of work stations to be associated with the turntable is relatively high. In addition, the internal areas of a turntable are practically unused, therefore leading to costly space requirements with no benefit received.

It has further been found that the overall dimensions and/or the operating requirements of known transferring devices present a hindrance in planning, in connection with the different operating stations.

OBJECTS OF THE INVENTION

Therefore, it is an object of the present invention to provide a transferring device for optical discs being processed in a disc manufacturing assembly and related method which avoids the aforementioned deficiencies of the prior art.

An additional object of the present invention is to provide a transferring device for optical discs being processed in a disc manufacturing assembly and related method which achieves increased efficiency in production of the optical disc and at the same time enables a greatly simplified structure.

Another object of the present invention is to provide a transferring device for optical discs being processed in a disc manufacturing assembly and related method which is of a reduced bulkiness and capable of offering large freedom in selecting the type and positioning of the individual operating units intended for optical disc processing.

A further object of this invention is to provide a transferring device being processed in a disc manufacturing assembly and related method which does not require a separate and specific drive member for the retention of the optical disc at each work station.

Various other objects, advantages and features of the present invention will become readily apparent from the ensuing detailed description and the novel features will be particularly pointed out in the appended claims.

SUMMARY OF THE INVENTION

In accordance with the present invention, a transferring device for optical discs being processed in a disc manufacturing apparatus, wherein a support arm is movable, upon the activation of a drive member, along its own longitudinal extension axis. A pick-up or handling assembly is arranged in this transferring device to operate on a forward advance line (n) and a backward advance or return line (n') respectively, which are defined parallel to each other and on opposite sides relative to the longitudinal extension axis of the support arm. The pick-up or handling assembly is thus capable of transferring at least one optical disc along the forward line (n) during the forward strokes of the support arm from the first to the second limit positions, and to transfer at least one optical disc along the backward line (n') during the return strokes of the support arm from the second to the first limit positions.

In accordance with an additional object of the present invention, a transferring process for optical discs being processed in a disc-making machine is also provided wherein an optical disc is deposited at a predetermined loading location coincident with a stop position defined along a forward advance line of the optical discs. The optical disc are then engaged by the pick-up or handling assembly carried by a support arm to be operated with a reciprocating motion between a first limit position and a second limit position, in the direction of its longitudinal extension axis parallel to the forward line. The support arm is subsequently moved from the first limit position to the second limit position to transfer the optical disc from the loading location to at least one stop position in alignment with the loading station, along the forward line. The optical disc is then engaged by the pick-up or handling assembly and arranged at an outlet end location coincident with a stop position on a backward advance or return line of the discs extending parallel to the longitudinal extension axis of the support arm on the opposite side relative to the forward line. The support arm is thereafter moved from the second limit position to the first limit position to transfer the optical disc from the outlet end location to at least one stop position in alignment with the outlet end location along the return line.

BRIEF DESCRIPTION OF THE DRAWINGS

The following detailed description, given by way of example, will best be understood in conjunction with the accompanying drawings which:

FIG. 2 is a fragmentary side elevational view of a work station removably engaged in the assembly framework of FIG. 1.

DETAILED DESCRIPTION OF CERTAIN PREFERRED EMBODIMENTS

Figure 1:
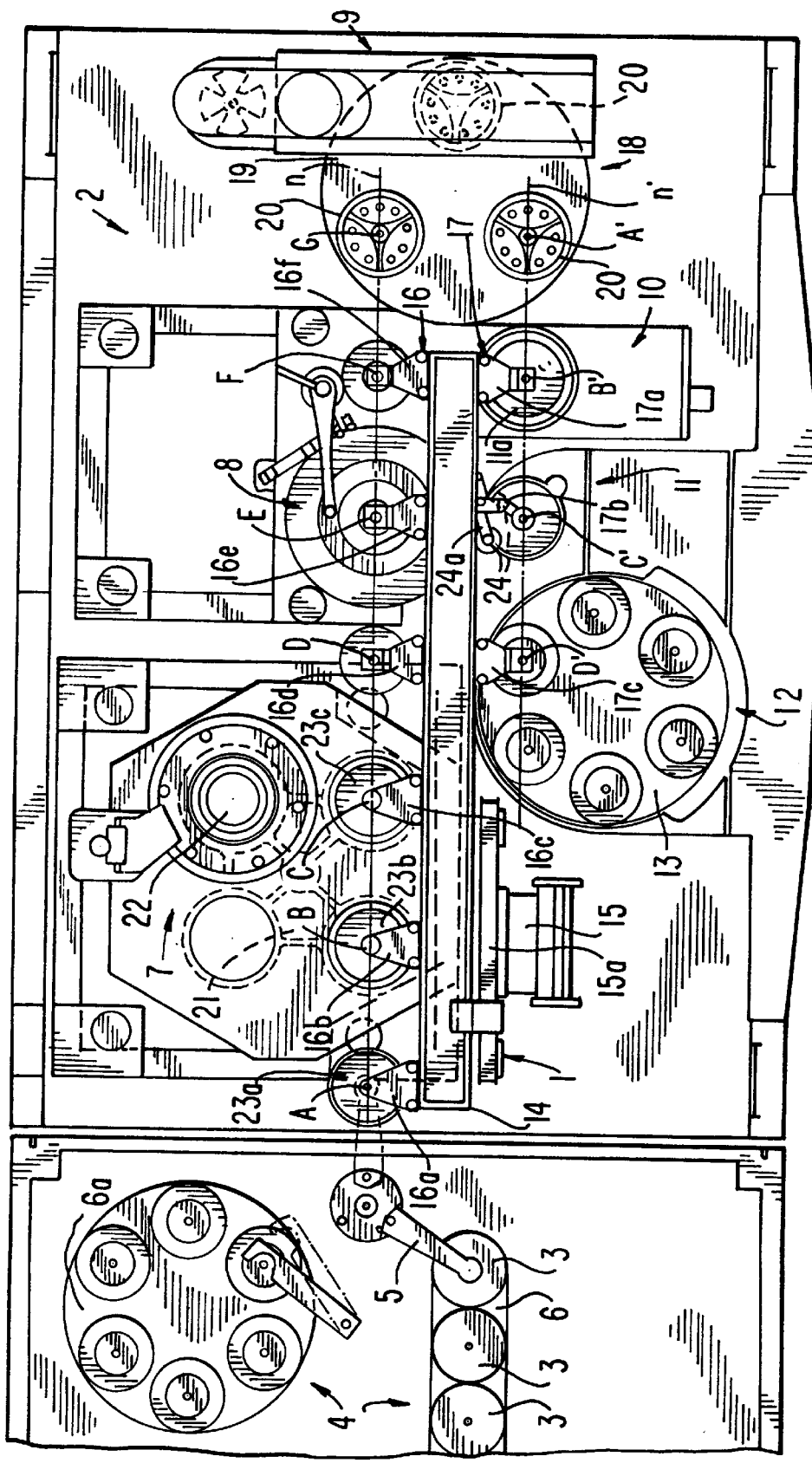
FIG. 1 is a front elevational view in diagrammatic form of a preferred embodiment of an assembly for making optical discs incorporating the transferring device in accordance with the teachings of the present invention.

With reference now to the drawings, wherein like reference numerals are used throughout and in particular to FIGS. 1 and 2, there is illustrated a transferring device for optical discs being processed in a disc-manufacturing assembly in accordance with the present invention. As is shown in FIG. 1, the transferring device 1 is operatively mounted on an assembly 2 for manufacturing optical discs 3. The optical discs 3 are processed, discharged from a molding unit (not shown) for example, and are supplied sequentially to the assembly 2 by a feeding unit generally identified by reference numeral 4. This feeding unit 4 includes a handling device provided with an angularly oscillatable rotating arm 5 intended for individually picking up the discs being processed 3 from a continuous feeder 6 connected with the molding unit or from an auxiliary magazine 6a supplied with discs 3 by the handling device 5 itself during possible nonoperating steps of the assembly 2.

As is shown in FIG. 1, the handling device 5 lays each disc 3 on an appropriate support (not shown) represented as loading location "A" of the assembly 2. The disc positioned at the loading location "A" is thus at an appropriate position for being picked up by the transferring device 1 to be then submitted to different processing steps located at respective work stations 7, 8, 9, 10, 11, 12.

In the embodiment herein described, and as is shown in FIG. 1, the processing cycle for each disc 3 involves employment of a metallizing station 7 arranged for coating the disc 3 surface carrying the recorded data with a thin reflective metal layer. A covering station 8 is located downstream of the metallizing station 7 and deposits a transparent protective element over the metallized surface of disc 3. In those applications where the assembly 2 is intended for manufacturing optical discs of the so-called "compact disc" (CD) type, the covering station 8 is substantially a lacquering station in which the protective element is achieved by applying a layer of transparent lacquer to the disc 3. The disc 3 is then submitted to a drying station 9 adapted to enable quick drying of the previously applied lacquer so that the disc may be subsequently transferred to a control station 10 where a qualitative inspection of the disc is performed.

FIG. 1 illustrates that a selecting station 11 is provided downstream of the control station 10. The selecting station 11 either sends possible faulty discs 3 to an auxiliary collecting magazine 11a or conveniently arranges the qualitatively-acceptable discs 3 so as to make them ready to be sent to an outlet station 12. This outlet station 12 receives the finished optical discs 3 in a collecting magazine 13 or the like and is adapted to enable removal of the discs from the assembly 2.

In accordance with the present invention, the path taken by the optical discs 3 to be subjected to the different work stations 7, 8, 9, 10, 11, 12 disposed in the assembly 2 advantageously has a forward or advance line "n" and a backward advance or return line "n'" parallel to and separated from each other, preferably of rectilinear extension. Along each of the forward and backward lines "n", "n'", the optical discs 3 are moved step by step, each step being confined between two stop positions "A, B, C, D, E, F, G, A', B', C', D'", placed at a predetermined distance from each other along the forward line.

More particularly, the forward line "n" comprises, in the embodiment shown, seven stop positions "A, B, C, D, E, F, G", the first of which, i.e. position "A", is coincident with the loading location at which the individual discs 3 are laid down by the handling device 5. The second return line "n'" in turn comprises four stop positions denoted by "A', B', C' and D',", respectively.

As better specified in the following, each of the work stations 7, 8, 9, 10, 11, 12 is adapted to operate on the disc 3 arranged at one of the stop positions, to submit it to the corresponding processing step.

Nonetheless, the transferring device 1 of the present invention includes a support arm 14 having its longitudinal axis parallel to the forward "n" and return "n'" lines.

The support arm 14 includes a corresponding drive member having a driving toothed belt 15a for example, which is driven by a stepping motor 15, for operation of the support arm with a reciprocating motion along its longitudinal extension axis, between a first and a second limit positions spaced apart from each other by a distance corresponding to that between two consecutive stop positions "A, B, C, D, E, F, G, A', B', C', D'".

The support arm 14 includes a pick-up or handling assembly preferably including a plurality of pick-up heads 16, 17 equidistant from each other by an extent corresponding to the stroke performed by the support arm 14 between the first and second limit positions. More particularly, a first series 16 and a second series 17 of the pick-up heads 16, 17 is provided and the pick-up heads 16, 17 laterally face each other with respect to the longitudinal extension axis of the support arm 14 so that they operate on the forward line "n" and return line "n'", respectively. In the embodiment shown, six pick-up heads 16a, 16b, 16c, 16d, 16e, 16f are mounted on the support arm 14 forming the first head series operating on the forward line "n", and three pick-up heads 17a, 17b, 17c forming the second head series operating on the return line "n'". In summary, each pick-up head 16a, 16b, 16c, 16d, 16e, 16f, 17a, 17b, 17c alternately operates between two stop positions "A, B, C, D, E, F, G, A', B', C', D'" disposed consecutively in side-by-side relation to transfer the individual discs 3 being processed from one position to the other.

Each of the pick-up heads 16a, 16b, 16c, 16d, 16e, 16f, 17a, 17b, 17c is movable perpendicularly to the longitudinal movement direction of the support arm 14 (i.e., at right angles to the extension plane in FIG. 1) between first and second operating positions to pick up the disc 3 from one of the stop positions "A, B, C, D, E, F, G, A', B', C' and D'" and deposit it to the following stop position. Each pick-up head 16a, 16b, 16c, 16d, 16e, 16f, 17a, 17b, 17c has one or more suction-cup elements that are pneumatically actuated to engage and reliably hold the respective optical disc 3.

According to a preferred feature of the present invention, the pick-up heads 16a, 16b, 16c, 16d, 16e, 16f, 17a, 17b, 17c can be operated individually and independently of each other, both in connection with the pneumatic actuation of the suction-cup elements and are movable in a direction perpendicular to the support arm 14. This advantageous feature appears to be useful for achieving a greater flexibility of use of the device 1 and, more generally, for easily and readily adapting the assembly 2 to different processing systems for different optical discs.

In accordance with a further feature of the present invention, a transferring member 18 which displace each optical disc 3 to transfer it from the forward line "n" to the return line "n'" operates close to at least one end of the support arm 14 and preferably at the arm end opposite to the loading location "A". This transferring member 18 includes a turntable 19 having at least two rest elements 20 intended for supporting respective optical discs 3 at an inlet end location placed along the forward line "n" and coincident with the seventh stop position "G", and at an outlet end location coincident with the first stop position "A" and placed along the return line "n'", respectively. Preferably, also disposed on turntable 19 is a third rest element 20, spaced apart by an angle of 120° from the other rest elements which are placed at the inlet "G" and outlet A'" end locations. The third rest element 20 is positioned at an auxiliary work station adapted to perform a predetermined operation on each optical disc 3. In the preferred embodiment herein illustrated, the auxiliary work station is the above-mentioned drying station 9.

Turntable 19 can be angularly rotated step-by-step in synchronism with the reciprocating motion of the support arm 14, to cyclically interchange the rest elements 20 placed at the inlet end location "G" and outlet end location "A'". In this event, the sequential rotation of turntable 19 is controlled by angular steps of 120°, so that each rest element 20, and consequently, the disc 3 laid thereon, is sequentially disposed at a position coincident with the inlet end location "G" of the drying station 9 (or any other auxiliary stations) and with the outlet end location "A'".

For the sake of clarity, the entire operating cycle of the transferring device 1 and optical disc assembling equipment 2 for achieving the processing steps of an optical disc 3 is now described, starting from the loading location "A" until the outlet station 12.

After the disc 3 has been placed at the loading location "A" by the handling device 5, the support arm 14 is brought to the first limit stroke, as shown in FIG. 1. The first head 16a of the first head series 16 is lowered towards the first operating position to engage the optical disc 3 by pneumatic actuation of the suction-cup elements associated therewith. The first head 16a is then brought to the second operating position and, by the subsequent displacement of the support arm 14 to the second limit position, the optical disc 3 removed from the loading location "AA" is brought to the second stop position "B" at which an entrance opening is provided for introduction of the disc into the metallizing station 7. By lowering the first head 16a towards the respective second operating position, the optical disc 3 is introduced into the metallizing station 7 wherein a rotating conveyor 21 performs transfer of the disc under a metallizing cathode 22.

In a subsequent step, the rotating conveyor 21 carries the metallized disc 3 close to an exit opening coincident with a third stop position, denoted by "C", for withdrawing the disc out of the metallizing station 7. Transfer of the optical disc 3 from the entrance opening to the exit opening of the metallizing station 7 occurs following successive steps, concurrently with each a backward-and-forward-movement cycle of the support arm 14 occurs, which results in the deposit of a new disc in the entrance opening and removal of the metallized disc from the exit opening.

The optical disc 3 disposed at the exit opening of the metallizing unit 7 is adapted to be picked up by a third pick-up head 16c to be transferred onto a parking support, placed at the fourth stop position "D".

Since the metallizing station 7 is arranged to operate under a vacuum, at least one closing element 23a, 23b, 23c is disposed on at least one of the pick-up heads 16a, 16b, 16c interacting with the metallizing station. These closing elements are adapted to sealingly close the above-mentioned entrance and/or exit openings. In the embodiment shown in FIG. 1, each of the first, second and third pick-up heads of the first series 16a, 16b, 16c is equipped with a respective closing element 23a, 23b, 23c.

In the above-described example, the second head 16b does not interact with disc 3 for performing transfer of same from the second stop position "B" to the third stop position "C", in that the transfer is directly performed within the metallizing unit 7. The second head 16b therefore only performs the function of tightly closing the entrance and exit openings of the metallizing unit 7 in an alternate manner, by means of the closing element 23b. The second head 16b can be, however, equipped with respective suction-cup elements to be pneumatically actuated for meeting particular requirements. As an exemplary sample, the second head 16b enables different operating cycles of the device 1 and/or adaptation of the device to metallizing stations of a type different from that described herein.

A fourth pick-up head 16d of the first series picks up the disc 3 up from the support arranged in the fourth stop position "D" to transfer the disk 3 to the covering station 8, coincident with a fifth stop position "E". In the example shown in FIG. 1, where the apparatus is intended for producing the so-called "compact discs", the covering station 8 coats the metallized surface of disc 3 with a lacquer layer. If the apparatus produces optical discs of a different type, the covering station 8 and the applied covering element can take a different form, such as digital video discs (DVD), where the covering element consists as well of a further neutral disc or a disc carrying respective data.

The disc treated in the covering station 8 is picked up by a fifth pick-up head 16e transferring it to another fixed supporting element (not shown) located at the sixth stop position "F". A sixth pick-up head 16f transfers the optical disc 3 from the sixth stop position "F" to the seventh stop position "G" coincident with the inlet end location combined with the transferring mechanism 18.

By rotating the turntable 19 through two consecutive steps, the disc is subjected to the drying station 9 to be then sent to the outlet end location coincident with the first stop location "A" placed on the return line "n'''".

The disc 3 is then removed therefrom by a first pick-up head 17a of the second series, to be transferred to the control station 10 operating at the second stop position "B'" on the return line "n'''". The disc 3 is thereafter transferred to the selecting station 11, disposed at the third stop position "C'" by a second pick-up head 17b (only partly shown) of the second series.

A selecting member operates in the selecting station 11, so that, depending on signals received from the control station 10, the disc 3 is selectively transferred to the auxiliary magazine 11a or arranged so as to be removed by a third pick-up head 17c which is part of the second series 17. As a result, the selecting member is formed of an auxiliary supporting element 24, substantially similar in structure to the supports arranged at the fourth "D" and sixth "F" stop positions on the forward line "n" and mounted to the end of an arm 24a oscillating about a vertical axis upon command of a fluid-operated actuator (not shown). The auxiliary supporting element 24 is selectively disposed at a receiving position (shown in broken line) where the auxiliary supporting element 24 is positioned corresponding to the third stop position "C'" on the return line "n'''" to receive the optical disc 3 transferred to this stop position by the second head 17b of the second series, or at a discarding position (shown in solid line) in which the auxiliary supporting element 24 is laterally moved apart from the third stop position "C'" and the auxiliary magazine 11a.

When the auxiliary supporting element 24 is at its discarding position, the optical disc 3 released by the second pick-up head 17b at the third stop position "C'" falls into the auxiliary collecting magazine 11a. This collecting magazine preferably includes a rod-like element disposed vertically in alignment with the third stop position "C'" on the return line "n'''", so the collecting magazine can receive the discarded discs in an orderly manner by engaging them at their central opening.

The qualitatively-accepted disc 3, held by the auxiliary supporting element 24 at the third stop position "C'" is transferred to the fourth stop position "D'" on the return line "n'''" to be released in the outlet station 12 by the third pick-up head 17c of the second series 17.

The transferring device 1 in accordance with the present invention enables a systematic and advantageous placement of the individual work stations 7, 8, 9, 10, 11, 12 along the forward path followed by the discs 3 being processed in the assembly 2. In particular, due to the fact that the forward path followed by the discs is essentially defined by two parallel lines covering a forward stroke "n'" and a backward stroke "n'''", the discs are retained within a very reduced space approximately extending along the longitudinal center line of the assembly 2. In this regard, most of the work stations 7, 8, 9, 10, 11, 12 are lined up on respectively opposite sides relative to the advance path, at positions disposed consecutively in side-by-side relation. Therefore, in accordance with one of the general objects of the present invention, this type of placement is advantageous for the purpose of reducing bulkiness and providing ease in servicing and replacement of the individual work stations.

Since the path follows two parallel forward "n" and return "n'" lines, the work time of the transferring device 1 can be optimized by eliminating dead time due to idle strokes, which idle strokes are required by the devices in accordance with the prior art. Actually, advancing of the discs in opposite directions on distinct forward "n" and return "n'" lines causes the discs disposed on the forward line to be transferred from a stop position to the next stop position during the forward strokes of the support arm from the first to the second limit positions. Moreover, transferring of the discs 3 placed on the return line is performed during the return stroke of the support arm from the second to the first limit positions. Accordingly, any dead time is eliminated in the operating cycle of the supporting device 1 of the present invention.

In accordance with a further object of the present invention, at least one of the work stations 7, 8, 9, 10, 11, 12 is mounted on an auxiliary framework 7a, 8a removably associated with the framework 2a being part of the machine 2. In the example herein described, this feature has been specifically illustrated with respect to the metallizing and covering stations, 7 and 8 respectively, the auxiliary frameworks of which are identified by 7a and 8a, respectively. However, the same construction concept can be adopted for any other work stations 9, 10, 11, 12 as well.

A positioning and fastening member 25 is preferably interposed between the auxiliary framework 7a, 8a of each work station 7, 8 and the assembly framework 2a. This positioning and fastening member is adapted to enable removable locking of the respective work station 7, 8 to a predetermined position, so that the work station may operate in a correct manner on the discs 3 moving along the assembly 2.

FIG. 2 illustrates in particular how the positioning and fastening member 25 associated with the covering station 8 (not shown in detail) can be utilized. In a preferred embodiment, the positioning and fastening member 25 includes a plurality of threaded tie rods 26 each of which is rotatably engaged in a fixed plate 27 supported by the framework 2a. Counter-plates 28 are arranged on the auxiliary framework 8a of the work station 8 and are provided with threaded housings to be operatively engaged by the tie rods 26. The auxiliary framework 8a, preferably movable on slide rollers 29, can be inserted into a respective space 30 arranged in the machine framework 2a. When the auxiliary framework 8a rests on the ground by means of the slide rollers 29, the upper surfaces of counter-plates 28 are spaced-apart from the respective fixed plates 27 by a distance "d" which is less than the length "l" of the threaded tie rods 26, as measured between the tie rod end and an abutment shoulder 26a carried by the tie rod which comes into contact with the fixed plate 27 by axial interference. Therefore, when counter-plate 28 is positioned under the respective fixed plate 27, the threaded tie rod 26 remains slightly raised, its end being in abutment against the end of the threaded housing of counter-plate 28. Shoulder 26a therefore is slightly spaced-apart from the fixed plate as shown by broken line in FIG. 2. Under this situation, the threaded tie rod 26 can be easily screwed down in the threaded housing of counter-plate 28 until its shoulder 26a is brought into abutment against the fixed plate 27. Following further screwing, the action of tie rod 26 causes raising of the entire work station 8 until the counter-plate 28 is brought into abutment with the fixed plate 27, thereby resulting in a perfect alignment in the horizontal plane between the work station 8 and the remaining parts of the machine 2.

Therefore, this solution enables removal of the individual work stations 7, 8 to be achieved very easily, for servicing and/or replacement.

It has accordingly been realized that due to interchangeability of the work stations, important advantages are achieved in terms of flexibility of use of the machine 2, making the machine adapted for processing optical discs of different types. For example, if a covering station 8 is employed which is adapted to deposit a lacquer layer for manufacture of "compact discs", this station can be easily interchanged with a station intended for feeding rigid covering discs, in order to adapt the machine 2 for production of digital video discs (DVD). The covering discs can be also directly fed by a molding unit arranged side-by-side of the machine 2, or by a machine identical with that in reference set up for supplying covering discs treated with a reflective metal layer, for making optical discs to be read on both faces (DVD1O).

While the present invention has been particularly shown and described with reference to certain preferred embodiments, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. A transferring device for optical discs being processed in a disc-making machine, comprising:

at least one support arm reciprocally movable in forward strokes and return strokes;

pick-up means operatively supported by said support arm for selectively picking up and releasing at least one optical disc being processed;

drive means acting on said support arm for reciprocally moving said arm between a first limit position and a second limit position, said support arm being movable as a result of said drive means along its own longitudinal extension axis; and said pick-up means being arranged to operate on a forward line and a return line respectively, which are defined parallel to each other and on opposite sides relative to the longitudinal extension axis of the support arm, to transfer at least one optical disc along the forward line during the forward strokes of the support arm from the first to the second limit positions, and to transfer at least one optical disc along the return line during the return strokes of the support arm from the second to the first limit positions; and wherein said pick-up means comprises a plurality of pick-up heads mounted to said support arm with each pick-up head being arranged to operate between two stop positions disposed consecutively in side-by-side relation to transfer the disc being processed from one stop position to the next respective consecutive stop position.

2. The transferring device of claim 1, wherein said pick-up heads are individually movable perpendicularly to the longitudinal movement direction of the support arm to pick up the disc from a stop position and lay it down at a next stop position.

3. The transferring device of claim 1, wherein said pick-up heads can be actuated pneumatically independently of each other for engagement and release of the disc being processed.

4. The transferring device of claim 1, wherein said pick-up heads are spaced-apart by a distance which is substantially equivalent to the distance of the stroke performed by the support arm between the first and second limit positions.

5. The device of claim 1, wherein said plurality of pick-up heads further comprises a first and a second series of pick-up heads laterally mounted on said support arm at mutually opposite positions relative to the longitudinal extension axis of the arm and adapted to operate on the forward line and return line, respectively.

6. The transferring device of claim 1, wherein at least one of said pick-up heads deposits the optical disc on a parking support located at one of said stop positions.

* * * * *

UNITED STATES PATENT AND TRADEMARK OFFICE
CERTIFICATE OF CORRECTION

PATENT NO. : 6,071,344

DATED : June 6, 2000

INVENTOR(s) : Luciano Perego

It is certified that errors appear in the above-identified patent and that said Letters Patent is hereby corrected as shown below:

On the cover page of the patent at line item [30] (Foreign Application Priority Data) change "97830111" to --97830111.7--

Signed and Sealed this

Twentieth Day of March, 2001

Attest:

NICHOLAS P. GODICI

*Attesting Officer*    Acting Director of the United States Patent and Trademark Office